United States Patent
Fan

(10) Patent No.: US 11,264,896 B2
(45) Date of Patent: Mar. 1, 2022

(54) TWO-PHASE BOOST CONVERTER WITH REDUCED VOLTAGE STRESS, AND INHERENT CURRENT BALANCING

(71) Applicant: KINETIC TECHNOLOGIES, San Jose, CA (US)

(72) Inventor: Haifeng Fan, San Jose, CA (US)

(73) Assignee: Kinetic Technologies, San Jose, CA (US)

( * ) Notice: Subject to any disclaimer, the term of this patent is extended or adjusted under 35 U.S.C. 154(b) by 0 days.

(21) Appl. No.: 16/444,555

(22) Filed: Jun. 18, 2019

(65) Prior Publication Data

US 2020/0403505 A1  Dec. 24, 2020

(51) Int. Cl.
  *H02M 3/155* (2006.01)
  *H02M 1/088* (2006.01)
  *H02M 1/00* (2006.01)

(52) U.S. Cl.
  CPC .......... *H02M 3/155* (2013.01); *H02M 1/088* (2013.01); *H02M 1/0048* (2021.05)

(58) Field of Classification Search
  CPC ......... H02M 1/088; H02M 2001/0048; H02M 3/155–1588; H02M 2003/1586; H02M 2003/1557
  See application file for complete search history.

(56) References Cited

U.S. PATENT DOCUMENTS

| | | | | |
|---|---|---|---|---|
| 10,811,971 B2* | 10/2020 | Ke | ........................ | H02M 3/07 |
| 2009/0174262 A1* | 7/2009 | Martin | ................. | H02M 3/157 307/82 |
| 2013/0235631 A1* | 9/2013 | Pahlevaninezhad | .... | H02M 1/42 363/126 |
| 2013/0301314 A1* | 11/2013 | Fu | ............................. | H02J 3/38 363/37 |
| 2015/0311792 A1* | 10/2015 | Amaro | ................ | H02M 3/1588 323/271 |
| 2015/0311794 A1* | 10/2015 | Khayat | ................. | H02M 3/158 323/271 |
| 2016/0322898 A1* | 11/2016 | Bianco | ................ | H02M 1/4225 |
| 2017/0324326 A1* | 11/2017 | Liu | ....................... | H02M 1/088 |
| 2018/0205307 A1* | 7/2018 | Vukadinovic | ......... | H02M 3/158 |
| 2018/0337532 A1* | 11/2018 | Abu Qahouq | ........ | H02M 3/155 |
| 2019/0058411 A1* | 2/2019 | Kitamoto | ................ | B60L 50/75 |

(Continued)

FOREIGN PATENT DOCUMENTS

KR  2018-0054201 A  5/2018

OTHER PUBLICATIONS

Notice to Submit Response [Office Action] dated Dec. 23, 2021, issued in related Korean Application No. 10-2020-0073178, with English translation (10 pages).

*Primary Examiner* — Jeffrey A Gblende
(74) *Attorney, Agent, or Firm* — Sheppard Mullin Richter & Hampton LLP

(57) ABSTRACT

A two-phase boost converter is provided. The converter includes a first boost converter coupled between an input node and a common node; and a second boost converter coupled between the input node and an output node, wherein the second boost converter comprises: a first transistor coupled between ground and an internal node, an inductor coupled between the input node and the internal node, a capacitor coupled between the internal node and the common node, and a second transistor coupled between the common node and the output node.

16 Claims, 6 Drawing Sheets

(56) References Cited

U.S. PATENT DOCUMENTS

| | | | |
|---|---|---|---|
| 2019/0181761 A1* | 6/2019 | Sano | H02M 3/155 |
| 2019/0386566 A1* | 12/2019 | Zhang | H02M 3/158 |
| 2020/0044567 A1* | 2/2020 | Barrass | H02M 3/1582 |
| 2020/0321868 A1* | 10/2020 | Michal | H02M 3/1582 |

* cited by examiner

TWO-PHASE BOOST CONVERTER WITH REDUCED VOLTAGE STRESS, AND INHERENT CURRENT BALANCING

TECHNICAL FIELD

This disclosure relates generally to DC-to-DC converters, and more specifically to boost converters.

BACKGROUND

Boost converters are used to "boost" a DC voltage, that is, to convert a given DC voltage to a higher DC voltage. Boost converters have many applications, one being to reduce the number of battery cells needed to obtain a particular DC voltage. Such converters are employed in electrified vehicles to reduce cost and weight. Two-Phase boost converters are widely used to achieve higher output power and/or output current. In conventional two-phase boost converters, current balancing control is typically required to split the current evenly among these two phases. In addition, the transistor switches in conventional two-phase boost converters experience high voltage stress of output voltage.

SUMMARY

In general, one aspect disclosed features a two-phase boost converter comprising: a first boost converter coupled between an input node and a common node; and a second boost converter coupled between the input node and an output node, wherein the second boost converter comprises: a first transistor coupled between ground and an internal node, an inductor coupled between the input node and the internal node, a capacitor coupled between the internal node and the common node, and a second transistor coupled between the common node and the output node.

Embodiments of the two-phase boost converter may include one or more of the following features. Some embodiments comprise a control circuit configured to provide complementary drive signals to gates of the first and second transistors. In some embodiments, the control circuit generates a timing signal according to a voltage at the output node. In some embodiments, the first boost converter comprises: a third transistor coupled between ground and a second internal node; a second inductor coupled between the input node and the second internal node; and a fourth transistor coupled between the second internal node and the common node. Some embodiments comprise a control circuit configured to provide first complementary drive signals to gates of the first and second transistors, and to provide second complementary drive signals to gates of the third and fourth transistors, wherein the first complementary drive signals are substantially 180 degrees out of phase with the second complementary drive signals. In some embodiments, the control circuit comprises: a driver having an output configured to provide a drive signal, wherein: the gate of the first transistor is coupled to the output of the driver, and a first inverter is coupled between the gate of the second transistor and the output of the driver; and a phase shifter having an input coupled to the output of the driver, wherein: the gate of the third transistor is coupled to an output of the phase shifter, and a second inverter is coupled between the gate of the fourth transistor and the output of the phase shifter. In some embodiments, the first transistor comprises a first MOSFET, wherein a source of the first MOSFET is coupled to ground, and a drain of the first MOSFET is coupled to the internal node; and the second transistor comprises a second MOSFET, wherein a source of the second MOSFET is coupled to the common node, and a drain of the second MOSFET is coupled to the output node. In some embodiments, the first transistor comprises a first MOSFET, wherein a source of the first MOSFET is coupled to ground, and a drain of the first MOSFET is coupled to the internal node; the second transistor comprises a second MOSFET, wherein a source of the second MOSFET is coupled to the common node, and a drain of the second MOSFET is coupled to the output node; the third transistor comprises a third MOSFET, wherein a source of the third MOSFET is coupled to ground, and a drain of the third MOSFET is coupled to the second internal node; and the fourth transistor comprises a fourth MOSFET, wherein a source of the fourth MOSFET is coupled to the second internal node, and a drain of the fourth MOSFET is coupled to the common node. Some embodiments comprise an input capacitor coupled between the input node and ground. Some embodiments comprise an output capacitor coupled between the output node and ground.

In general, one aspect disclosed features a two-phase boost converter comprising: a first transistor coupled between ground and a first internal node; a first inductor coupled between an input node and the first internal node; a capacitor coupled between the first internal node and a common node; a second transistor coupled between the common node and an output node; a third transistor coupled between ground and a second internal node; a second inductor coupled between the input node and the second internal node; and a fourth transistor coupled between the second internal node and the common node.

Embodiments of the method may include one or more of the following features. Some embodiments comprise a control circuit configured to provide a timing signal, wherein: one of the first and second transistors is driven according to the timing signal, and the other of the first and second transistors is driven according to an inversion of the timing signal; and one of the third and fourth transistors is driven according to a phase-shifted version of the timing signal, and the other of the third and fourth transistors is driven according to an inversion of the phase-shifted version of the timing signal. In some embodiments, the control circuit generates the timing signal according to a voltage at the output node. Some embodiments comprise a phase shifter configured to generate the phase-shifted version of the timing signal. Some embodiments comprise a first inverter configured to generate the inversion of the timing signal based on the timing signal; and a second inverter configured to generate the inversion of the phase-shifted version of the timing signal based on the timing signal. Some embodiments comprise the phase-shifted version of the timing signal and the timing signal differ in phase by 180 degrees. Some embodiments comprise first, second, third, and fourth drivers configured to drive the first, second, third, and fourth transistors, respectively, according to the timing signal, the inversion of the timing signal, the phase-shifted version of the timing signal, and the inversion of the phase-shifted version of the timing signal. In some embodiments, the first transistor comprises a first MOSFET, wherein a source of the first MOSFET is coupled to ground, and a drain of the first MOSFET is coupled to the first internal node; the second transistor comprises a second MOSFET, wherein a source of the second MOSFET is coupled to the common node, and a drain of the second MOSFET is coupled to the output node; the third transistor comprises a third MOSFET, wherein a source of the third MOSFET is coupled to ground, and a drain of the third MOSFET is coupled to the second internal node; and the fourth transistor comprises a fourth MOSFET, wherein a source of the fourth MOSFET is coupled to the second internal node, and a drain of the fourth MOSFET is coupled to the common node. Some embodiments comprise an input capacitor coupled between the input node and ground. Some embodiments comprise an output capacitor coupled between the output node and ground.

These and other features and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Embodiments of the disclosed technology provide a two-phase boost converter with reduced voltage stress, and inherent current balancing. These embodiments, and their advantages, are described in detail below.

Figure 1:
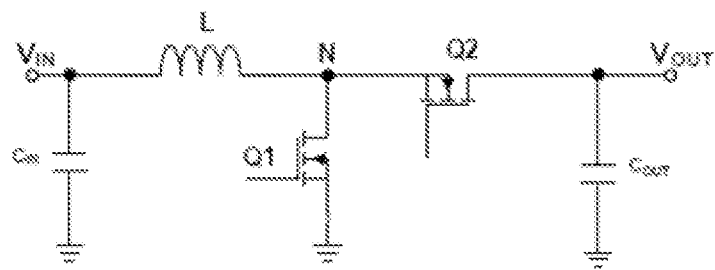
FIG. 1 illustrates a conventional single-phase boost converter.

FIG. 1 illustrates a conventional single-phase boost converter. Referring to FIG. 1, the converter includes an inductor L, and two metal-oxide semiconductor field-effect transistors (MOSFETs) Q1 and Q2. The inductor L is coupled between the input node $V_{IN}$ and a common node N. One transistor Q1 is coupled between the common node and ground, while the other transistor Q2 is coupled between the common node N and the output node $V_{OUT}$. The converter also includes an input capacitor $C_{IN}$ coupled between the input node $V_{IN}$ and ground, and an output capacitor $C_{OUT}$ coupled between the output node $V_{OUT}$ and ground. During operation, the inductor L is charged and discharged. During charging, transistor Q1 is turned on, and transistor Q2 is turned off, so that the voltage $V_{IN}$ is applied across the inductor L, causing the inductor L to generate a magnetic field. During discharging, transistor Q1 is turned off, and transistor Q2 is turned on, so that the inductor L converts the magnetic field into current, which is provided to the output node $V_{OUT}$. The capacitors $C_{IN}$ and $C_{OUT}$ serve to smooth the input and output voltages.

Figure 2:
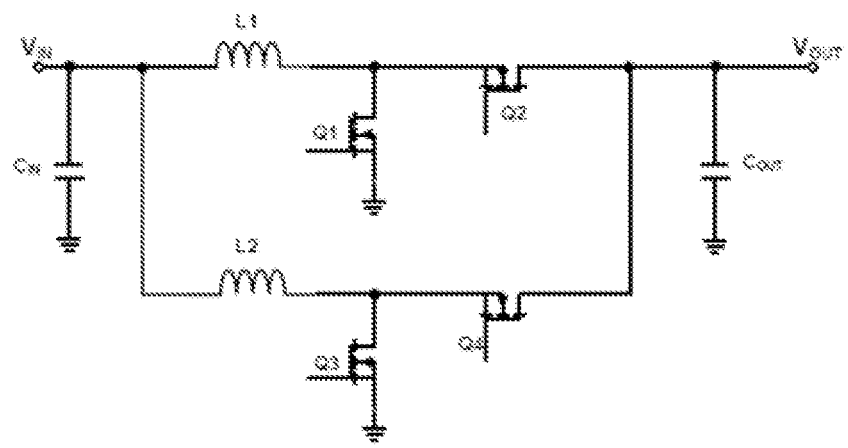
FIG. 2 illustrates a conventional two-phase boost converter.

FIG. 2 illustrates a conventional two-phase boost converter. Referring to FIG. 2, the converter includes two conventional boost converters, each being similar to the conventional boost converter of FIG. 1. One converter includes inductor L1 and transistors Q1 and Q2. The other converter includes inductor L2 and transistors Q3 and Q4. An input capacitor $C_{IN}$, and an output capacitor $C_{OUT}$, serve to smooth the input and output voltages, respectively. The two converters are operated out of phase, so that the total current ripple seen by input capacitor $C_{IN}$ and output capacitor $C_{OUT}$ can be reduced. Thanks to this arrangement, dual-phase boost converters may provide more output current than single-phase boost converters.

Conventional two-phase boost converters are widely used in high-current and high-power applications because they have several advantages over single-phase boost converters. In a two-phase boost converter, the total output current is typically split in half and conduction loss in MOSFETs and inductors can be significantly reduced. The phase interleaving of the two converters reduces the root mean square (RMS) current of the input capacitor $C_{IN}$ and output capacitor $C_{OUT}$, thereby reducing equivalent series resistance (ESR) power loss of the input and output capacitors. As a result, the overall power conversion efficiency can be improved. In a two-phase boost converter, the power dissipation and heat are distributed over a larger amount of components and larger PCB area, which provides improved thermal performance. The disclosed converters possess all of these advantages and more.

But conventional dual-phase boost converters also have several drawbacks. Such converters require complicated control circuits to achieve current sharing. And all of the transistors experience high voltage stress, at the level of the output voltage $V_{OUT}$.

Figure 3:
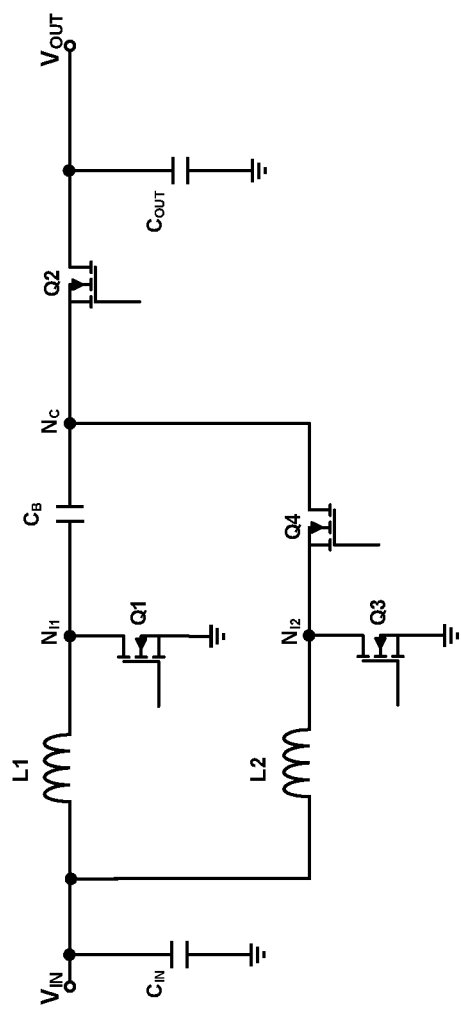
FIG. 3 illustrates a two-phase boost converter according to embodiments of the disclosed technology.

FIG. 3 illustrates a two-phase boost converter according to embodiments of the disclosed technology. Referring to FIG. 3, the converter includes a first boost converter coupled between an input node $V_{IN}$, and a common node Nc, and a second boost converter coupled between the input node $V_{IN}$ and an output node $V_{OUT}$. An input capacitor $C_{IN}$ is coupled between the input node $V_{IN}$ and ground. An output capacitor $C_{OUT}$ is coupled between the output node $V_{OUT}$ and ground.

The first boost converter includes an inductor L2 and transistors Q3 and Q4. The inductor L2 is coupled between the input node $V_{IN}$ and an internal node $N_{I2}$. The transistor Q3 is coupled between the internal node $N_{I2}$ and ground. In particular, the drain of the transistor Q3 is coupled to the internal node $N_{I2}$, and the source of the transistor Q3 is coupled to ground. The transistor Q4 is coupled between the common node Nc and the internal node $N_{I2}$. In particular, the drain of the transistor Q4 is coupled to the common node Nc, and the source of the transistor Q4 is coupled to the internal node $N_{I2}$.

The second boost converter includes an inductor L1, transistors Q1 and Q2, and a AC coupling capacitor $C_B$. The inductor L1 is coupled between the input node $V_{IN}$ and an internal node $N_{I1}$. The transistor Q1 is coupled between the internal node $N_{I1}$ and ground. In particular, the drain of the transistor Q1 is coupled to the internal node $N_{I1}$, and the source of the transistor Q1 is coupled to ground. The capacitor $C_B$ is coupled between the internal node $N_{I1}$ and the common node Nc. The transistor Q2 is coupled between the common node Nc and the output node $V_{OUT}$. In particular, the drain of the transistor Q2 is coupled to the output node V$_{OUT}$, and the source of the transistor Q2 is coupled to the common node Nc.

In the described embodiments, the transistors are implemented as MOSFET transistors. However, in other embodiments, other transistors may be used instead, or in addition to, MOSFET transistors.

Figure 4:
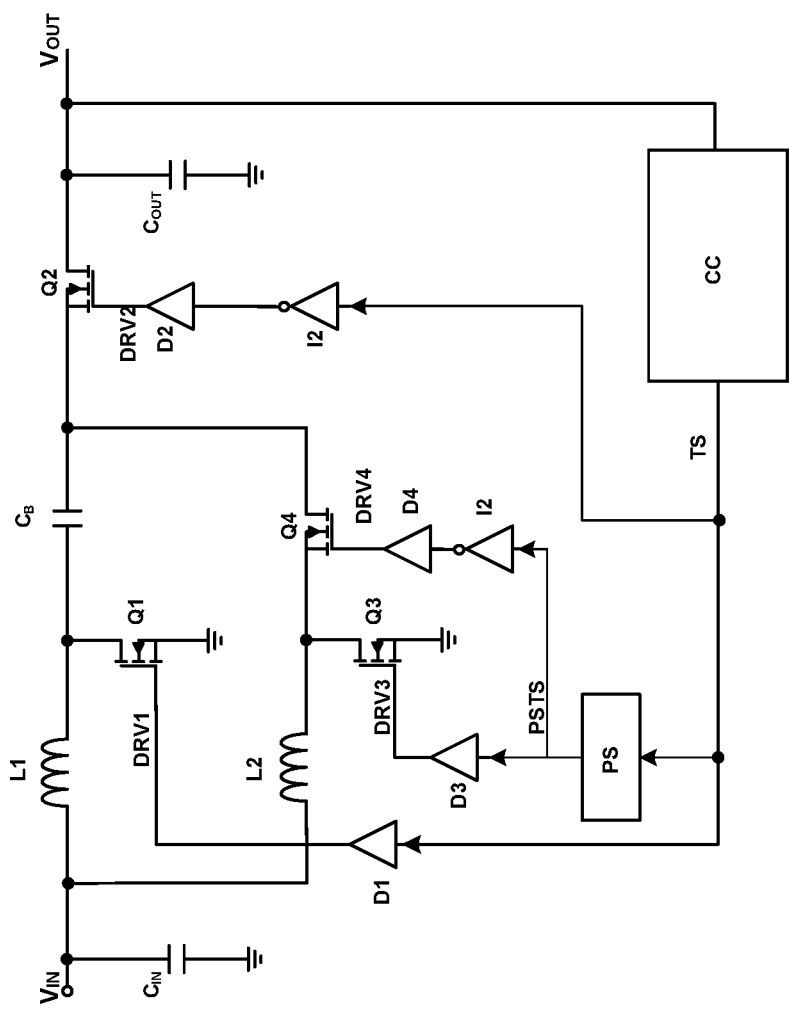
FIG. 4 illustrates the two-phase boost converter of FIG. 3, along with control circuitry.

FIG. 4 illustrates the two-phase boost converter of FIG. 3, along with control circuitry, according to embodiments of the disclosed technology. Referring to FIG. 4, a control circuit CC monitors the voltage at the output node V$_{OUT}$, and provides a timing signal TS in accordance with that voltage. The timing signal TS is provided to a driver D1, which provides a corresponding drive signal DRV1 to the gate of transistor Q1. The timing signal TS is also provided to an inverter I1, which provides an inverse timing signal to a driver D2. Based on the inverse timing signal, the driver D2 provides a drive signal DRV2 to the gate of transistor Q2.

The timing signal TS is also provided to a phase shifter PS. The phase shifter PS shifts the phase of the timing signal TS by 180 degrees. The phase-shifted timing signal PSTS is provided to a driver D3, which provides a corresponding drive signal DRV3 to the gate of transistor Q3. The phase-shifted timing signal PSTS is also provided to an inverter I2, which provides an inverse phase-shifted timing signal to a driver D4. Based on that inverse phase-shifted timing signal, the driver D4 provides a drive signal DRV4 to the gate of transistor Q4.

Figure 5:
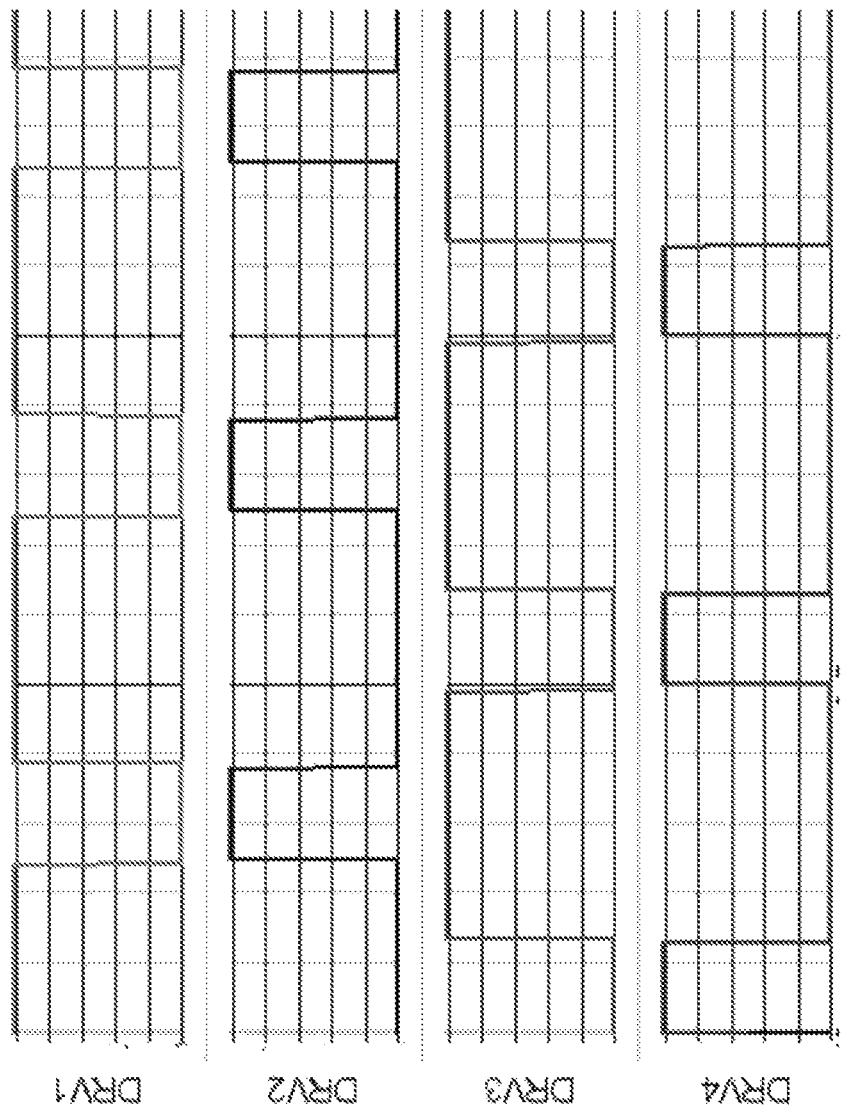
FIG. 5 illustrates example waveforms for the drive signals of the dual-phase boost converter of FIG. 4.

FIG. 5 illustrates example waveforms for the drive signals of the two-phase boost converter of FIG. 4 according to embodiments of the disclosed technology. Referring to FIG. 5, it can be seen that drive signal DRV2 is the inverse of the drive signal DRV1, and that drive signal DRV4 is the inverse of drive signal DRV3. In other words, drive signals DRV1 and DRV2 are complementary, and drive signals DRV3 and DRV4 are complementary. In FIG. 5, it can also be seen that drive signals DRV3 and DRV4 are 180 degrees out of phase with drive signals DRV1 and DRV2, respectively.

As mentioned above, the disclosed converters exhibit the same advantages as conventional two-phase boost converters and more. For example, the disclosed converters impose lower voltage stress, and reduced switching drain-source voltages, on the transistors. These advantages are illustrated in FIGS. 6A-C.

Figures 6A, 6B, 6C:
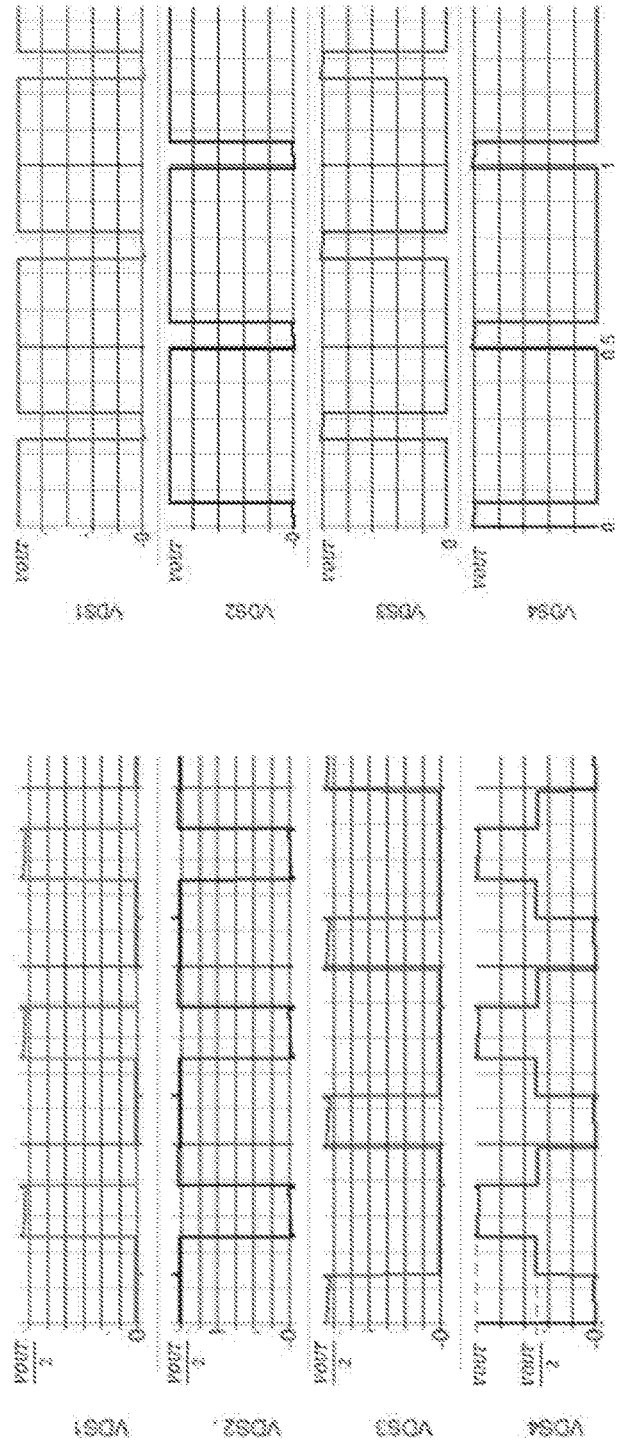
FIG. 6A illustrates the drain-source voltages experienced by the transistors of the converter of FIG. 4 when controlled by the waveforms illustrated in FIG. 5.
FIG. 6B illustrates the drain-source voltages for the corresponding transistors of the conventional two-phase boost converter of FIG. 2.
FIG. 6C presents a table that compares the voltage stress, and the drain-source voltage VDS when switching, for each transistor.

FIG. 6A illustrates the drain-source voltages experienced by the transistors of the converter of FIG. 4 when controlled by the waveforms illustrated in FIG. 5. Referring to FIG. 6A, four waveforms are illustrated. The waveforms are labeled VDS1, VDS2, VDS3, and VDS4, and illustrate the drain-source voltages for the transistors Q1, Q2, Q3, and Q4, respectively, of FIG. 4. FIG. 6B illustrates the drain-source voltages for the corresponding transistors of the conventional two-phase boost converter of FIG. 2.

FIG. 6C presents a table that compares the voltage stress, and the drain-source voltage VDS when switching, for the disclosed converter of FIG. 4 and the conventional converter of FIG. 2. Referring to FIG. 6C, it can be seen that the voltage stress has been halved for transistors Q1, Q2, and Q3. This reduced voltage stress enables the use of transistors with lower voltage ratings. Referring again to FIG. 6C, it can be seen that the VDS voltage when switching has been halved for all of the transistors. This reduction in switching voltage reduces switching loss, and improves the efficiency of the converter.

Figure 7:
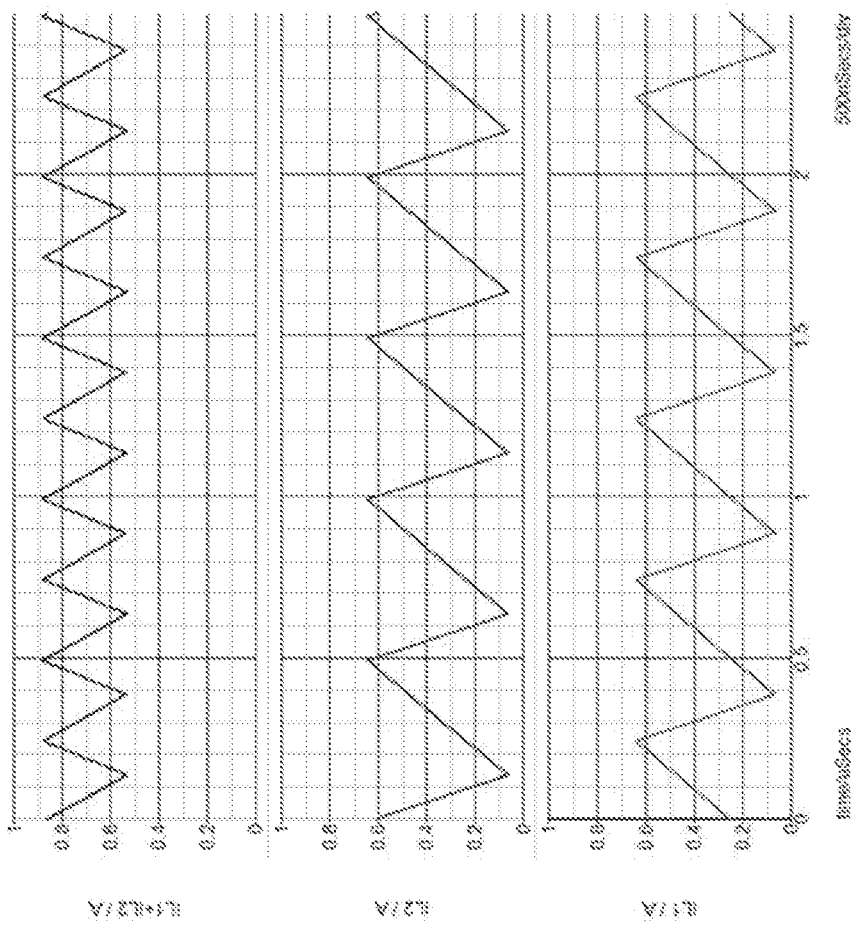
FIG. 7 illustrates inherent current balancing for duty cycles greater than 50 percent according to the disclosed technology.

Another advantage of the disclosed two-phase boost converters is their inherent current balancing. With conventional two-phase boost converters, complex current-sharing control circuitry is required to achieve current balancing. But current balancing is inherent in the disclosed converters. This inherent current balancing is illustrated in FIG. 7 for duty cycles greater than 50 percent according to the disclosed technology. Referring to FIG. 7, three waveforms are shown. The waveform at the bottom of FIG. 7 represents the inductor current IL1 for the inductor L1 of FIG. 4. The waveform in the middle of FIG. 7 represents the inductor current IL2 for the inductor L2 of FIG. 4. The waveform at the top of FIG. 7 represents the combined inductor current IL1+IL2. As can be seen in FIG. 7, the frequency of the combined inductor current doubles and the amplitude of the combined inductor current is significantly smaller than the amplitudes of the individual inductor currents IL1 and IL2. In particular, the peak-to-peak current for each inductor is approximately 0.6 A, while the combined peak to peak current is only approximately 0.4 A. As can be seen in FIG. 7, the disclosed converters feature inherent current balancing without additional controls, thereby simplifying the design of the control circuit. Current balancing is essential to ensure the advantages of two-phase boost converters including improved efficiency, enhanced thermal performance, and improved load transient response.

Another advantage of the disclosed converters is reduced duty cycle. That is, compared with conventional two-phase boost converters, for the same input and output voltages, the disclosed converters operate with a lower duty cycle. The duty cycle D for the conventional two-phase boost converter is given by equation (1).

$$D = \frac{Vout - Vin}{Vout} \quad (1)$$

The duty cycle the for the disclosed two-phase boost converters is given by equation (2).

$$D = \frac{Vout - 2 \cdot Vin}{Vout} \quad (2)$$

As can be seen from equations 1 and 2, the disclosed converters feature significantly reduced duty cycles. The reduced duty cycle reduces inductor current ripple and the RMS current, resulting in lower conduction losses in MOSEFTs and inductor windings. In addition, the reduced duty cycle reduces the inductor core loss by reducing the voltage-second product applied to the inductor. Therefore, reduced duty cycle provides improved power converter efficiency.

Spatially relative terms such as "under," "below," "lower," "over," "upper," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising," and the like are open ended terms that indicate the presence of stated elements or features, but do not preclude additional elements or features.

The articles "a," "an" and "the" are intended to include the plural as well as the singular, unless the context clearly indicates otherwise.

Although this invention has been disclosed in the context of certain implementations and examples, it will be understood by those skilled in the art that the present invention extends beyond the specifically disclosed implementations to other alternative implementations and/or uses of the invention and obvious modifications and equivalents thereof. Thus, it is intended that the scope of the present invention herein disclosed should not be limited by the particular disclosed implementations described above.

Furthermore, the skilled artisan will recognize the interchangeability of various features from different implementations. In addition to the variations described herein, other known equivalents for each feature can be mixed and matched by one of ordinary skill in this art to construct analogous systems and techniques in accordance with principles of the present invention.

It is to be understood that not necessarily all objects or advantages may be achieved in accordance with any particular implementation of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

What is claimed is:

1. A two-phase boost converter comprising:
a first boost converter coupled between an input node and a common node, wherein the first boost converter comprises:
a first inductor coupled between the input node and a first node,
a first transistor coupled between the first node and a ground, and
a second transistor coupled between the first node and the common node, wherein a path between the first node and the common node consists of the second transistor;
a second boost converter coupled between the input node and an output node through the common node, wherein the second boost converter comprises:
a second inductor coupled between the input node and a second node,
a third transistor coupled between the ground and the second node,
a capacitor coupled between the second node and the common node, and
a fourth transistor coupled between the common node and the output node, wherein a path between the common node and the output node consists of the fourth transistor; and
a control circuit coupled to the output node, wherein the control circuit is configured to monitor a voltage at the output node and provide a first drive signal to drive the first boost converter and a second drive signal to drive the second boost converter based on the voltage, wherein the first drive signal is provided by the control circuit to drivers associated with the first boost converter through a phase shifter and the second drive signal is provided to drivers associated with the second boost converter, wherein the first drive signal is out of phase with the second drive signal, and wherein:
the phase shifter is configured to shift a phase of the first drive signal based on a phase of the second drive signal;
the drivers associated with the first boost converter comprises:
a first driver having an input coupled to an output of the phase shifter and an output configured to provide a first timing signal to a gate of the first transistor; and
a second driver and a first inverter, arranged in series, having an input coupled to the output of the phase shifter and an output configured to provide an inverted first timing signal to a gate of the second transistor, wherein the first timing signal and the inverted first timing signal are generated based on the first drive signal; and
the drivers associated with the second boost converter comprises:
a third driver having an output configured to provide a second timing signal to a gate of the third transistor; and
a fourth driver and a second inverter, arranged in series, having an output configured to provide an inverted second timing signal to a gate of the fourth transistor, wherein the second timing signal and the inverted second timing signal are generated based on the second drive signal.

2. The two-phase boost converter of claim 1, wherein the first drive signal drives the first and second transistors of the first boost converter and the second drive signal drives the third and fourth transistors of the second boost converter.

3. The two-phase boost converter of claim 2, wherein the first drive signal and the second drive signal are complementary drive signals.

4. The two-phase boost converter of claim 1, wherein:
the first transistor comprises a first MOSFET, wherein a source of the first MOSFET is coupled to the ground and a drain of the first MOSFET is coupled to the first node; and
the second transistor comprises a second MOSFET, wherein a source of the second MOSFET is coupled to the first node and a drain of the second MOSFET is coupled to the common node.

5. The two-phase boost converter of claim 1, wherein:
the third transistor comprises a third MOSFET, wherein a source of the third MOSFET is coupled to the ground and a drain of the third MOSFET is coupled to the second node; and
the fourth transistor comprises a fourth MOSFET, wherein a source of the fourth MOSFET is coupled to the common node, and a drain of the fourth MOSFET is coupled to the output node.

6. The two-phase boost converter of claim 1, further comprising:
an input capacitor coupled between the input node and the ground.

7. The two-phase boost converter of claim 1, further comprising:
an output capacitor coupled between the output node and the ground.

8. The two-phase boost converter of claim 1, wherein the first timing signal and the second timing signal are substantially out of phase by 180 degrees, and wherein the inverted first timing signal and the inverted second timing signal are substantially out of phase by 180 degrees.

9. A two-phase boost converter comprising:
a first inductor coupled between an input node and a first node;
a first transistor coupled between the first node and a ground;

a second transistor coupled between the first node and a common node, wherein a path between the first node and the common node consists of the second transistor;

a second inductor coupled between the input node and a second node;

a third transistor coupled between the ground and the second node;

a capacitor coupled between the second node and the common node;

a fourth transistor coupled between the common node and the output node, wherein a path between the common node and the output node consists of the fourth transistor; and a control circuit coupled to the output node, wherein the control circuit is configured to monitor a voltage at the output node and provide a first drive signal to drive the first transistor and the second transistor and a second drive signal to drive the third transistor and the fourth transistor based on the voltage, and wherein the first drive signal is provided by the control circuit through a phase shifter, wherein:

the second drive signal comprises a timing signal to the third transistor and an inversion of the timing signal to the fourth transistor; and the first drive signal comprises a phase-shifted version of the timing signal to the first transistor and an inversion of the phase-shifted version of the timing signal to the second transistor, wherein the phase shifted version of the timing signal is generated by a first driver coupled to the phase shifter and the inversion of the phase-shifted version of the timing signal is generated by a second driver and a first inverter arranged in series and coupled to the phase shifter.

10. The two-phase boost converter of claim 9, wherein the first drive signal and the second drive signal are complementary drive signals.

11. The two-phase boost converter of claim 9, wherein the phase-shifted version of the timing signal and the inversion of the phase-shifted version of the timing signal are generated through the phase shifter.

12. The two-phase boost converter of claim 9, wherein the phase-shifted version of the timing signal and the timing signal differ in phase by 180 degrees.

13. The two-phase boost converter of claim 9, wherein the timing signal is generated by a third inverter and the inversion of the timing signal is generated by a fourth driver and a second inverter arranged in series and coupled to the control circuit.

14. The two-phase boost converter of claim 9, wherein:
the first transistor comprises a first MOSFET, wherein a source of the first MOSFET is coupled to the ground and a drain of the first MOSFET is coupled to the first node;

the second transistor comprises a second MOSFET, wherein a source of the second MOSFET is coupled to the first node and a drain of the second MOSFET is coupled to the common node;

the third transistor comprises a third MOSFET, wherein a source of the third MOSFET is coupled to the ground and a drain of the third MOSFET is coupled to the second node; and the fourth transistor comprises a fourth MOSFET, wherein a source of the fourth MOSFET is coupled to the common node and a drain of the fourth MOSFET is coupled to the output node.

15. The two-phase boost converter of claim 9, further comprising:
an input capacitor coupled between the input node and the ground.

16. The two-phase boost converter of claim 9, further comprising:
an output capacitor coupled between the output node and the ground.

* * * * *